United States Patent
Sultenfuss et al.

(10) Patent No.: US 9,703,341 B1
(45) Date of Patent: Jul. 11, 2017

(54) SYNCHRONOUS POWER BURST FOR SYSTEM TURBO

(71) Applicant: Dell Products, L.P., Round Rock, TX (US)

(72) Inventors: Andrew Thomas Sultenfuss, Leander, TX (US); Vijay Thyagarajan Ramakrishnan, Atlanta, GA (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 14/995,071

(22) Filed: Jan. 13, 2016

(51) Int. Cl.
*G06F 1/26* (2006.01)
*H04B 5/00* (2006.01)

(52) U.S. Cl.
CPC ............. *G06F 1/26* (2013.01); *H04B 5/0037* (2013.01)

(58) Field of Classification Search
CPC ............ G06F 1/26; G06F 1/32; H04B 5/0037
USPC ....................................... 713/300
See application file for complete search history.

(56) References Cited

U.S. PATENT DOCUMENTS

| 9,166,438 | B2 | 10/2015 | Sultenfuss et al. | |
|---|---|---|---|---|
| 2010/0281278 | A1* | 11/2010 | Hsiao | G06F 1/08 713/300 |
| 2014/0125131 | A1* | 5/2014 | Lalitnuntikul | G06F 1/266 307/31 |
| 2014/0281618 | A1* | 9/2014 | Sultenfuss | G06F 1/30 713/323 |
| 2015/0067364 | A1* | 3/2015 | Nakazawa | G06F 1/263 713/320 |
| 2015/0137598 | A1* | 5/2015 | Hawawini | G01R 31/00 307/31 |
| 2016/0259389 | A1* | 9/2016 | Wells | G06F 1/3206 |

* cited by examiner

*Primary Examiner* — Vincent Tran
(74) *Attorney, Agent, or Firm* — Fogarty LLP (57) ABSTRACT

Systems and methods for synchronous adapter power energy burst mode support for system turbo are described. In some embodiments, an Information Handling System (IHS) may include a processor and a memory coupled to the processor, the memory having program instructions stored thereon that, upon execution by the processor, cause the IHS to: determine that the processor is expected to enter a turbo mode; and transmit a command to a power adaptor in anticipation of the turbo mode to make an additional amount of energy available to the IHS when the processor enters the turbo mode.

18 Claims, 6 Drawing Sheets

SYNCHRONOUS POWER BURST FOR SYSTEM TURBO

FIELD

This disclosure relates generally to Information Handling Systems (IHSs), and more specifically, to systems and methods for a synchronous power burst mode for system turbo.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A wireless power delivery system typically includes a wireless charging pad upon which an IHS may be placed for charging. The IHS can communicate with the pad via near field communication (NFC) to indicate that the IHS available to receive power. The wireless power delivery system can then wirelessly transmit power to the IHS, for example, to charge an internal battery of the IHS.

SUMMARY

Embodiments of systems and methods for a synchronous power burst mode for system turbo are described herein. In an illustrative, non-limiting embodiment, an Information Handling System (IHS) may include a processor and a memory coupled to the processor, the memory having program instructions stored thereon that, upon execution by the processor, cause the IHS to: determine that the processor is expected to enter a turbo mode; and transmit a command to a power adaptor in anticipation of the turbo mode to make an additional amount of energy available to the IHS when the processor enters the turbo mode.

In some embodiments, the power adaptor may include an AC power adaptor. Additionally or alternatively, the power adaptor may include a wireless charger. The power adaptor may be configured to, in response to receiving the command and prior to the processor entering the turbo mode, preload a capacitor with an additional electrical charge sufficient to prevent power drooping below a threshold at the moment the processor enters the turbo mode.

To determine that the processor is expected to enter a turbo mode, the program instructions may further cause the IHS to monitor an Operating System (OS) for a turbo request. Additionally or alternatively, the program instructions may further cause the IHS to monitor a temperature of the IHS and a battery level of the IHS.

The program instructions, upon execution, may further cause the IHS to characterize a time interval between the time of the determination and the time at which the processor enters the turbo mode. For example, the program instructions may cause the IHS to characterize a time interval for a plurality of load conditions based, at least in part, upon a battery charge status. The program instructions may further cause the IHS to characterize a time delay between the time the command is sent and the time at which the additional amount of energy is available to the IHS.

Then the program instructions, upon execution, may further cause the IHS to transmit the command at a time equal to the time interval minus the time delay. Additionally or alternatively, the command may request that the power adaptor make an additional amount of energy available to the IHS at a time equal to the time interval minus the time delay.

In another illustrative, non-limiting embodiment a power adaptor may include a power source and a controller coupled to the power source, the controller configured to, in response to receiving the command from an IHS in anticipation of the IHS entering a turbo mode, make an additional amount of energy available to the IHS when the IHS enters the turbo mode. The controller may be configured to preload a capacitor with an additional charge sufficient to avoid power drooping at the moment when the IHS enters the turbo mode. The power adaptor may also include a wireless charging pad coupled to the power source. And the command may be received via an out-of-band channel.

In yet another illustrative, non-limiting embodiment, a method may include characterizing a time interval between: (a) a time of a determination that a processor of an Information Handling System (IHS) is expected to enter a turbo mode and (b) a time at which the processor enters the turbo mode; characterizing a time delay between: (a) a time a command is sent to a power adaptor requesting a power boost and (b) a time at which the power boost is available to the IHS; and storing the time interval and time delay for a given set of conditions.

The method may include determining that the processor is expected to enter the turbo mode; and transmitting the command to a power adaptor in anticipation of the turbo mode to make the power boost available to the IHS when the processor enters the turbo mode. The method may also include transmitting the command at a time equal to the time interval minus the time delay corresponding to a set of conditions under which the processor is at the time of the determination. Additionally or alternatively, the method may include transmitting the command at a time equal to the time interval minus the time delay corresponding to a set of conditions under which the processor is expected to be when it enters the turbo mode.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
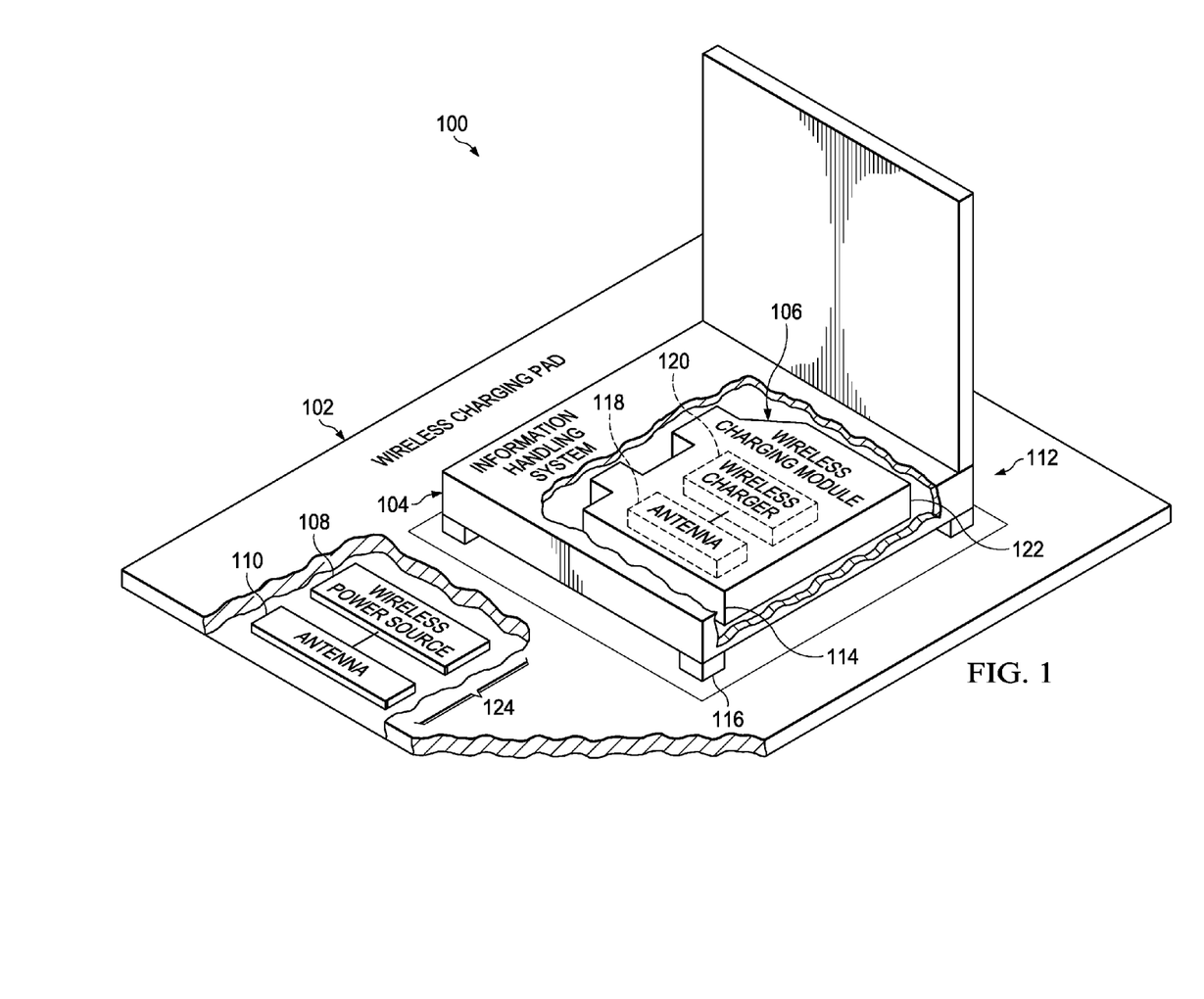
FIG. 1 is a block diagram of an example of a wireless power delivery system according to some embodiments.

FIG. 1 is a block diagram of an example of wireless power delivery system 100 according to some embodiments. For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Wireless power delivery system 100 includes wireless charging pad 102, IHS 104, and a wireless charging module 106. The wireless charging pad 102 includes wireless power source 108, antenna 110, and landing pad 112. IHS 104 includes optical drive bay 114 and pads 116. Wireless charging module 106 includes antenna 118 and wireless charger 120. Wireless power source 108 is in communication with antenna 110, which in turn is in communication with antenna 118 of wireless charging module 106. Antenna 118 is in communication with wireless charger 120.

Figure 3:
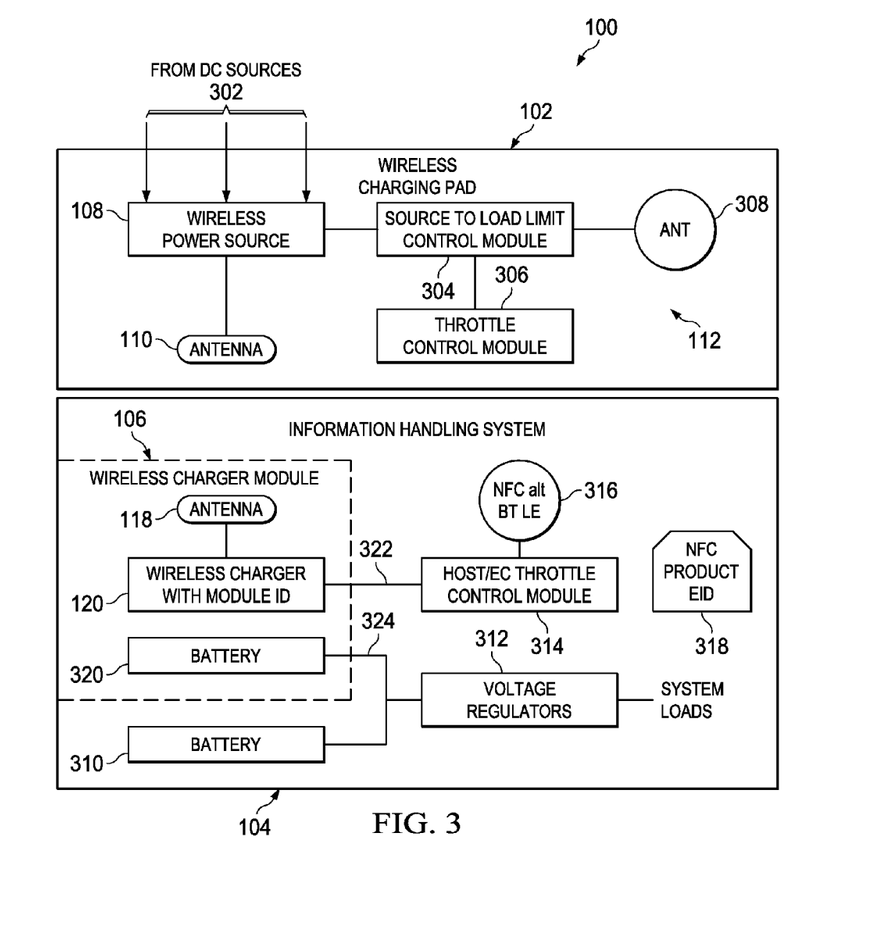
FIG. 3 is a block diagram illustrating additional implementation details of the wireless power delivery system according to some embodiments.

Wireless charging module 106 may be shaped to fit within a standard optical drive bay, such as optical drive bay 114 of IHS 104. Thus, wireless charging module 106 may be inserted into optical drive bay 114 of IHS 104, and may connect with the IHS via one or more buses. For example, wireless charging module 106 can connect with HIS 104 via serial advanced technology attachment (SATA) mini bus 322 (FIG. 3) to communicate with the IHS. Wireless charging module 106 may also connect with IHS 104 to provide power to the IHS via a high power connector 324 (FIG. 3).

When wireless charging module 106 is connected to IHS 104, wireless charger 120 may communicate with IHS 104 via the SATA mini bus 322 to provide information about the wireless charging module. For example, information may include a class of the wireless charging module 106, an amount of power that the wireless charging module can provide, a type of the wireless charging module, a maximum amount of voltage that the wireless charging module can provide, and the like. IHS 104 may use that information to detect whether wireless charging module 106 is compatible with a power system of IHS 104. When IHS 104 has determined that wireless charging module 106 is a compatible charging module, the IHS can sent the power system in a ready state to receive power from the wireless charging module.

Wireless charging pad 102 may detect when a device such as IHS 104 is placed on top landing pad 112 of the wireless charging pad, and may transmit a detect signal in response to detecting the IHS. For example, wireless charging pad 102 may detect IHS 104 when a light sensor on wireless charging pad 102 is covered by the IHS, by a pressure sensor of the wireless charging pad detecting the IHS, by metal tabs of the wireless charging pad being placed in physical communication with the IHS, etc.

IHS 104 may receive the detect signal from the wireless charging pad, and may respond by transmitting a presence signal to the wireless charging pad. The presence signal may include a repeating pulse signal, referred to as a chirp, and may also include information associated with IHS 104 and wireless charging module 106, such as a class of IHS and the class of the wireless charging module. The class of IHS 104 and the class of wireless charging module 106 can indicate a maximum power needed for the IHS, or the like. In an embodiment, landing pad 112 may be a designated location of wireless charging pad 102 with a specific orientation for IHS 104 so that the antennas 110 and 118 may align properly.

Wireless charging module 106 includes plastic bottom portion 122 of an enclosure of the wireless charging module. The remaining portions, such as front, back, left, right, and top portions, of the enclosure of wireless charging module 105 may be metal, plastic, or any other type of material capable of supporting and protecting the components located within the wireless charging module. The bottom portion of wireless charging module 106 may be plastic to enable antenna 118 of the wireless charging module to communicate with antenna 110 of wireless charging pad 102. Similarly, IHS 104 includes bottom portion 202, which in turn includes a non-metallic portion 204 (FIG. 2).

Figure 2:
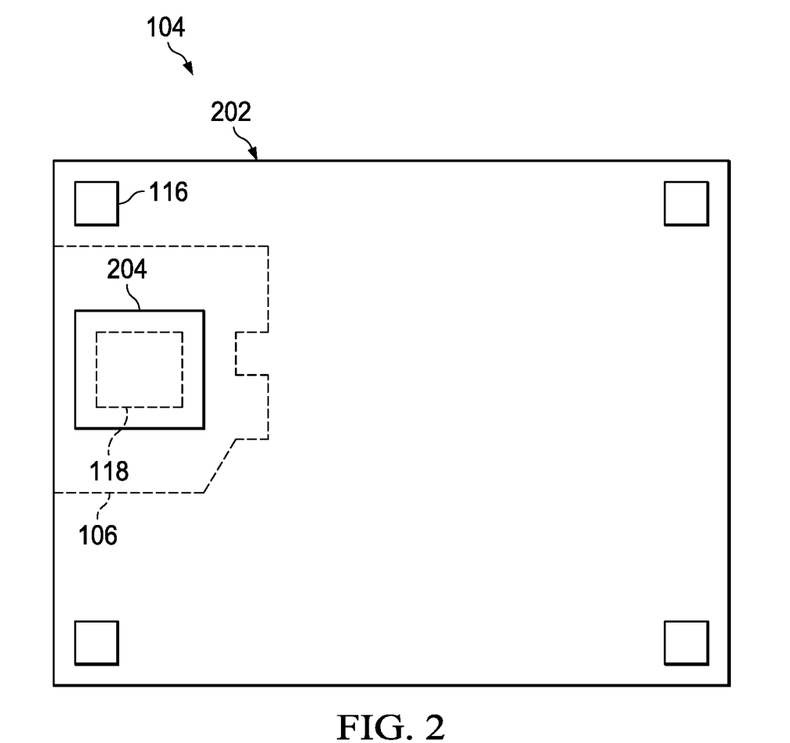
FIG. 2 is a block diagram of components within the wireless power delivery system according to some embodiments.

FIG. 2 is a block diagram of components within the wireless power delivery system according to some embodiments. As such, FIG. 2 shows IHS 104 including bottom portion 202, non-metallic portion 204, and pads 116. In an embodiment, an enclosure of IHS 104, including bottom portion 202, is a metal enclosure, such as a magnesium metal alloy. If the metal enclosure of IHS 104 is between antenna 118 of wireless charging module 106 and antenna 110 of wireless charging pad 102 of FIG. 1, the metal enclosure may be configured to prevent a power transfer between the two antennas.

Thus, non-metallic portion 204 of bottom portion 202 may be positioned so that the non-metallic portion is located below antenna 118 when wireless charging module 106 in inserted into IHS 104. The position of non-metallic portion 204 below antenna 118 can enable the antenna of wireless charging module 106 to communicate with antenna 110 of the wireless charging pad 102 without having interface from metal enclosure.

In different embodiments, non-metallic portion 118 may be substantially the same size as antenna 118, may be larger than the antenna but smaller that wireless charging module 106, may be substantially the same size as the wireless charging module, may be larger than the wireless charging module, etc. Non-metallic portion 204 may be composed of any material that does not affect the power transfer between antennas 110 and 118.

Referring back to FIG. 1, wireless charging pad 102 may receive the presence signal from IHS 104, and may then set an initial power level to be provided from wireless power source 108 to wireless charging module 106. The initial power level may be a minimum power level available from wireless charging pad 102, may be a maximum power level available from the wireless charging pad, or may be any power level in between the minimum and maximum power levels. Wireless charging pad 102 may then transmit the wireless power to wireless charging module 106 via antenna 110.

Wireless charging pad 102 may use one or more techniques to provide power wirelessly, including inductive techniques, resonant inductive techniques, capacitive transfer techniques, beamed power transfer, such as laser or microwave transfer, or the like. For purposes of discussion, however, it is assumed that wireless charging pad 102 transfers power wirelessly using inductive power transfer.

Plastic bottom portion 122 of wireless charging module 106, non-metallic portion 204 of IHS 104, and space 124 between antenna 110 and antenna 118 creates an air gap for the inductive power transfer between the two antennas. The amount of power needed to be transferred from antenna 110 to antenna 118 can vary based on space 124, which may be a calculated distance that is determined based on the height of the pads 116, the distance from bottom portion 202 of IHS 104 and bottom portion 122 of wireless charging module 106, and a distance between antenna 110 and the top of wireless charging pad 102. Antenna 118 of wireless charging module 106 may receive wireless power from the antenna 110 and may provide power to wireless charger 120, which in turn converts the power to be used by IHS 104.

IHS 104 may monitor its current operating conditions and determine whether to change a power state of IHS 104. For example, if IHS 104 is receiving the maximum amount of power from wireless charging pad 102 and then IHS 104 enters a lower power mode, IHS 104 can send a power state change signal to wireless charging pad 102. The power state change may indicate a new power state for IHS 104.

Wireless charging pad 102 may receive the power state change signal and may adjust the power level provided by wireless power source 108 to IHS 104, such that a proper power level is provided to IHS 104 without having excess power that is not used or not having enough power. IHS 104 may continually monitor its operating mode and provide any necessary state change signals to wireless charging pad 102.

FIG. 3 shows a more detailed embodiment of the wireless power delivery system 100 including wireless charging pad 102, IHS 104, and a plurality of direct current DC sources 302 according to some embodiments. Wireless charging pad 102 includes landing pad 112, which in turn includes source-to-load limit control module 304, throttle control module 306, antenna 308, wireless power source 108, and antenna 110. Antenna 110 is in communication with wireless power source 108. Wireless power source 108 is in communication with source-to-load limit control module 304, which in turn is in communication with throttle control module 306 and with antenna 308.

IHS 104 includes battery 310, voltage regulators 312, host/embedded controller (EC) throttle control module 314, near field communication (NFC) alternative Bluetooth Low Energy (BT LE) antenna 316, and NFC product Electronic Data Identification (EDID) tag 318. Wireless charging module 106 includes battery 320, antenna 118, and wireless charger 120. Antenna 118 is in communication with wireless charger 120, which in turn is in communication with host/EC throttle control module 314 via communication bus 322. Wireless charger 120 is also in communication with battery 320, with battery 310, and with voltage regulators 312 via power connector 324. In an embodiment, power connector 324 may be a system management bus, and it may also include low power pins to provide power to logic components in wireless charging module 106.

Figure 7:
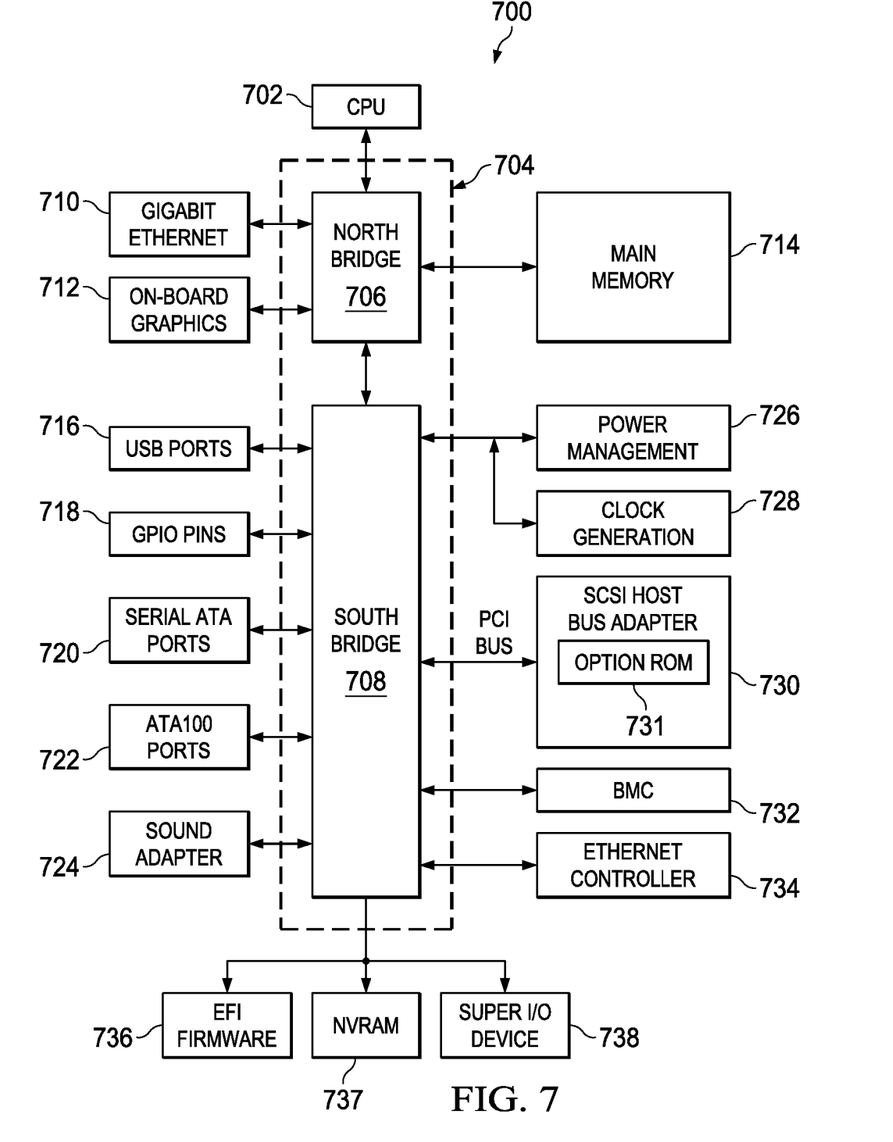
FIG. 7 is a block diagram of an example of an Information Handling System (IHS) configured to implement the systems and methods described herein according to some embodiments.

Voltage regulators 312 can provide multiple regulated voltages to different systems loads of IHS 104, such as a central processing unit, a memory, a display device, and the like (FIG. 7). Host/EC throttle control module 314 is in communication with NFC alternate BT LE antenna 316. Host/EC throttle control module 314 can be a hardware module, a software module, and/or any combination of a hardware and software module. For example, host/EC module 314 may be a power management integrated circuit, a power management unit, or the like. The plurality of DC sources 302 can include an automatic air source, an alternating current (AC)-to-DC source, and a universal serial bus (USB) power source, or the like.

When wireless charging module 106 is connected to IHS 104, wireless charger 120 can communicate with host/EC throttle control module 314 of IHS 104 to provide information about the wireless charging module. For example, information can include a class of the wireless charging module 106, an amount of power that the wireless charging module can provide, a type of the wireless charging module, and the like. Host/EC throttle control module 314 may use the information to detect whether wireless charging module 106 is compatible with a power system of IHS 104. When host/EC throttle control module 314 has determined that wireless charging module 106 is compatible with IHS 104, the host/EC throttle control module can set the power system of IHS 104 in a ready state to receive power from wireless charging module 106.

When IHS 104 containing wireless charging module 106 is placed within a NFC range of landing pad 112 of wireless charging pad 102, NFC product EDID tag 318 can transmit a presence signal, referred to as a chirp, to indicate that IHS 104 is within range of the wireless charging pad. The presence signal may be a repeating pulse that can be received by antenna 308, which in turn can provide the presence signal to source-to-load limit control 306. In some implementations, a presence signal from NFC tag 318 may also include information about wireless charging module 106, such as a class of the wireless charging module.

When source-to-load limit control module 304 receives the presence signal from antenna 308, the source-to-load limit control module determines whether another signal is received from throttle control module 306. If a signal is not received from throttle control module 306, source-to-load limit control module 304 may set an operation level of wireless charging pad 102 to an initial operation level, such as a minimum level. Source-to-load limit control module 304 may send the operation level to wireless power source 108, which may receive power from one of DC power sources 306.

Wireless power source 108 may then provide power to antenna 110, which in turn can wirelessly provide the power to antenna 118 of wireless charging module 106. Wireless charging pad 102 may use one or more techniques to provide power wirelessly, including inductive techniques, resonant inductive techniques, capacitive transfer techniques, beamed power transfer, such as laser or microwave transfer, etc. In some embodiments, plastic portion 122 (FIG. 1) of wireless charging module 106 and non-metallic portion 204 (FIG. 2) of IHS 104 can enable the power to be provided from antenna 110 to antenna 118 via inductive power transfer.

Antenna 118 may receive wireless power from the antenna 110, and may provide power to wireless charger 120. Wireless charger 120 may then convert power received from antenna 118 to a power level and a voltage level that can be utilized by IHS 104, such as, for example, 45 or 65 Watts and 19.5 volts.

Wireless charger 120 can supply the converted power to battery 310 and/or voltage regulators 312. The power provided to battery 310 may be used to charge the battery, and power provided to voltage regulators 312 may be supplied at a proper voltage to the remaining components of IHS 104. If battery 310 is fully charged and IHS 104 does not require the entire amount of power received by wireless charging module 106 from wireless charging pad 102, wireless charger 120 may provide the remaining power to the battery 320. The power provided to battery 320 may be used to charge the battery, which can be used as a secondary battery for IHS 104.

Host/EC throttle control module 314 can receive information about the power provided by wireless charging pad 102 from wireless charger 120. The information can include whether wireless charging pad 102 is compatible with the wireless charger converter, a total amount of power that the wireless charging pad is able to provide, or the like. Host/EC throttle control module 314 can also determine information about IHS 104, such as a percentage of the batteries 310 and 320 that is charged, an operation mode of IHS 104, and the like.

If host/EC throttle control module 314 determines that wireless charging pad 102 is not compatible with the class of wireless charging module 106, the host/EC throttle control module can set a flag to cause wireless charger 120 not to receive power from the wireless charging pad. Host/EC throttle control module 314 can also notify the user, via a display device, that IHS 104 is not receiving power from wireless charging pad 102. If host/EC throttle control module 314 determines that wireless charging pad 102 is compatible with wireless charging module 106, host/EC throttle control module 314 can determine an amount of power that is available from the wireless charging pad. If host/EC throttle control module 314 determines that the maximum amount of power available from wireless charging pad 102 is less than the amount needed to operate IHS 104 at maximum power, host/EC throttle control module may modify an operating mode of IHS 104, such as operating below the maximum power.

For example, host/EC throttle control module 314 can cause IHS 104 to enter a standby or low power mode in response to determining that the maximum amount of power available from wireless charging pad 102 is substantially less than the amount needed by the IHS. Host/EC throttle control module 314 may cause IHS 104 to remain in the low power mode while battery 310 is charged to a high enough capacity to operate the IHS. In another embodiment, host/EC throttle control module 314 may reduce the operational mode of IHS 104, such that the voltage supplied to the central processing unit, the memory, and other components of IHS 104 is reduced.

If host/EC throttle control module 314 determines that wireless charging pad 102 can provide more power than needed by IHS 104 for maximum operation power, host/EC throttle control module may determine a power state needed for IHS 104 and may send the power state to throttle control module 306. When throttle control module 306 receives the power state from host/EC throttle control module 314, the throttle control module can determine an operation level for wireless charging pad 102. Throttle control module 306 may then send the operation level to source-to-load limit control module 304, which in turn can determine an amount of power to be provided by wireless power source 108. Source-to-load limit control module 304 may send a signal to wireless power source 108 to set the power level for the wireless power source to provide to IHS 104 via antenna 110.

Wireless charger 120 may receive power from antenna 118 and it may provide the power to the battery 310, voltage regulator(s) 312, or battery 320. While wireless charging module 106 is receiving power from wireless charging pad 102, host/EC throttle control module 314 may continually monitor the operational mode of IHS 104 and adjust the power state provided to throttle control module 306. For example, IHS 104 may operate in a maximum power mode, and may switch to a low power mode such that IHS 104 does not need the same amount of power. The power state can indicate the amount of power to be provided to wireless charging module 106 connected IHS 104. In this situation, host/EC throttle control module 314 may determine a new power state and send the new power state to throttle control module 306, which in turn can adjust the operation level of wireless charging pad 102. The change in the operation level of wireless charging pad 102 may result in a change in the amount of power provided to IHS 104.

If wireless charging pad 102 cannot provide the amount of power requested by Host/EC throttle control module 314 or any amount of power to IHS 104, the wireless charging pad can send information to host/EC throttle control module 314 to indicate the current power available. Host/EC throttle control module 314 can then set a flag to indicate that a certain amount of power cannot be received from wireless charging pad 102. Host/EC throttle control module 314 may also set a flag when battery 310 is fully charged, and another flag when battery 320 is fully charged. Host/EC throttle control module 314 may then send information to throttle control module 306 to indicate that IHS 104 does not currently need power from wireless charging pad 102.

When IHS 104 and wireless charging module 106 are no longer in communication with wireless charging pad 102, host/EC throttle control module 314 can clear any flags set. Thus, if IHS 104 begins to communicate with wireless charging pad 102 again, the communication and setup between host/EC throttle control module 314 and throttle control module 306 can restart as described above. In another embodiment, when IHS 104 is no longer in communication with wireless charging pad 102, host/EC throttle control module 314 can continue to maintain flags indicating that batteries 310 and 320 are fully charged until a point in time, if any, that one or both of the batteries becomes less than fully charged.

As used herein, the term "turbo mode" refers to a mode of operation of IHS 104 that accelerates processor and/or graphics performance for peak loads, automatically allowing processor cores to run faster than their rated operating frequency or clock rates (if they are operating below power, current, and temperature specification limits). Whether a processor enters into turbo mode, and the amount of time the processor spends in that mode, depends upon the workload and operating environment of IHS 104.

In various embodiments, IHS 104 and power delivery system 100 may be further adapted for supporting IHS 104's turbo mode. To this end, systems and methods described herein provide a control system between IHS 104 (that is, the system under power/charge) and wireless power delivery system 100 (that is, the charging system) to allow charging system 100 to build up field/energy in anticipation of an upcoming turbo load. This variable output voltage rides on top of the typical or nominal output voltage, rising and falling as needed to support burst energy demand.

In various implementations, the aforementioned rise in output voltage may be temporary (e.g., for approximately 10-15 ms) and matches or reflects the IHS 104's turbo period and/or overhead. As discussed in more detail below, this burst of additional energy may be triggered by a "P_sys" state or flag that allows control of turbo (i.e., available/not available) and commands to be sent to charging system 100 to enable an extended power mode of operation (with a higher output voltage).

Control may use timed or measured events to begin delivering additional power to the system on or just before a turbo load comes on, in a synchronous manner. The additional power is provided, at least in part, in the form of a pre-charge of one or more capacitors (and/or the load line) with additional energy.

Again, in many embodiments, this additional energy is only temporarily provided. When in the off, normal, or non-turbo mode, components are allowed to cool down, which permits that those components be made smaller. When in turbo mode, a burst occurs where the regulated output voltage is driven up. The pulse of raised voltage and/or attendant flux in wireless charging supports higher DC delivery for brief periods of time. The higher voltage allows current to flow in switch-mode-off conditions by getting the load line synchronized with the turbo mode event with zero or very low latency (that is, with no lag in the load line), such that power flows into turbo mode smoothly. Control is accomplished with feedback between IHS 104 and system 100 to synchronize turbo "engagement," including situations where turbo may not be completely supported as maximum but it can be supported to some degree, for instance, based on thermal headroom of the setup. Single or repetitive bursts may be formed based on system conditions.

Figure 4:
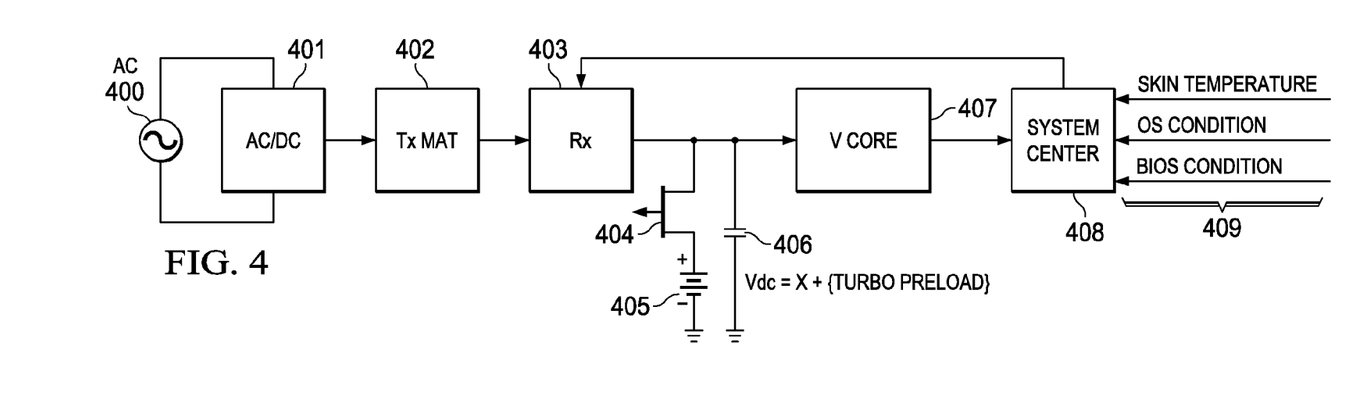
FIG. 4 is a block diagram of an example of a system for wireless charging according to some embodiments.

To better illustrate the foregoing, FIG. 4 is a block diagram of an example of a system for boost turbo wireless charging according to some embodiments. As shown, AC/DC converter circuit 401 is coupled to AC source 400 and to power transmitter 402; which may be implemented in part by wireless power source 108 and antenna 110 of system 100. On the IHS 104 side, power receiver 403 is coupled to power transmitter 402 and to an output stage modeled as transistor 404, voltage source 405, and capacitor 406. Capacitor 406 is coupled to voltage core 407, which in turn is coupled to system center 408.

System center 408 may receive information regarding a number of system conditions 409, such as, for example, the temperature of one or more components (e.g., a processor core), Operating System conditions (e.g., pending turbo requests), and BIOS conditions (e.g., upcoming turbo window). In some cases, system center 408 may be implemented by a processor of IHS 104 executing a set of instructions effecting various techniques described herein, the processor being provided one or more voltage sources from voltage core 407. Generally speaking, system center 408 may create a feedback loop (e.g., using an out-of-band communication channel such as via a Bluetooth connection or the like) with power transmitter 402 to request that capacitor 406 be pre-charged in anticipation of the processor entering a turbo mode, in a synchronous manner.

Figure 5:
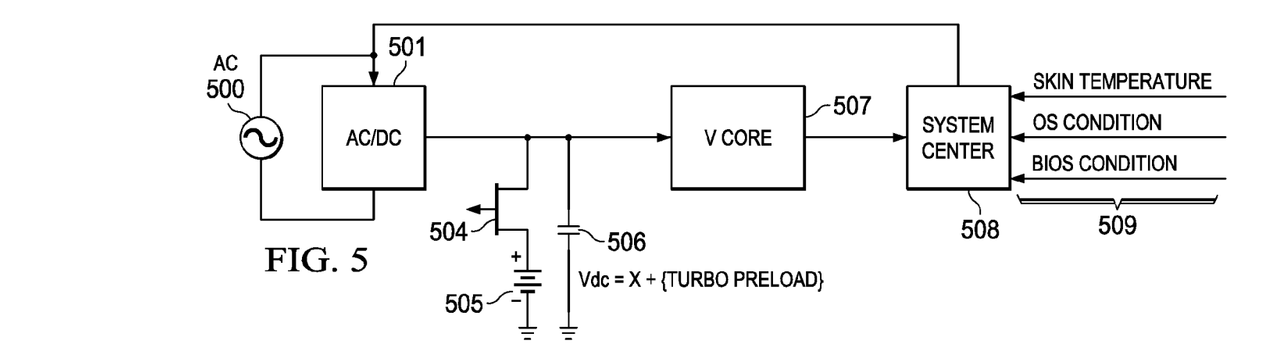
FIG. 5 is a block diagram of an example of a system for wired charging according to some embodiments.

Although various systems and methods described herein are discussed in the context of wireless charging system 100, it should be noted that these techniques may also be applied when wired AC/DC power sources are used. In that regard, FIG. 5 is a block diagram of an example of a system for boost turbo wired charging as an alternative to system 100, according to some embodiments. Particularly, AC/DC adapter 501 is coupled to AC power source 500. Similarly as in FIG. 4, here the output stage is also modeled as transistor 504, voltage source 505, and capacitor 506. Capacitor 506 is coupled to voltage core 507, which in turn is coupled to system center 508, also configured to receive system information 509.

As in FIG. 4, system center 508 may create a feedback loop with adapter 501 to request that capacitor 406 be pre-charged in anticipation of the processor entering the turbo mode, also in a synchronous manner. In general, the system of FIG. 5 allows a smaller AC adapters to be used; having turbo support makes smaller sources appears larger at lower cost, size, and weight.

Figure 6:
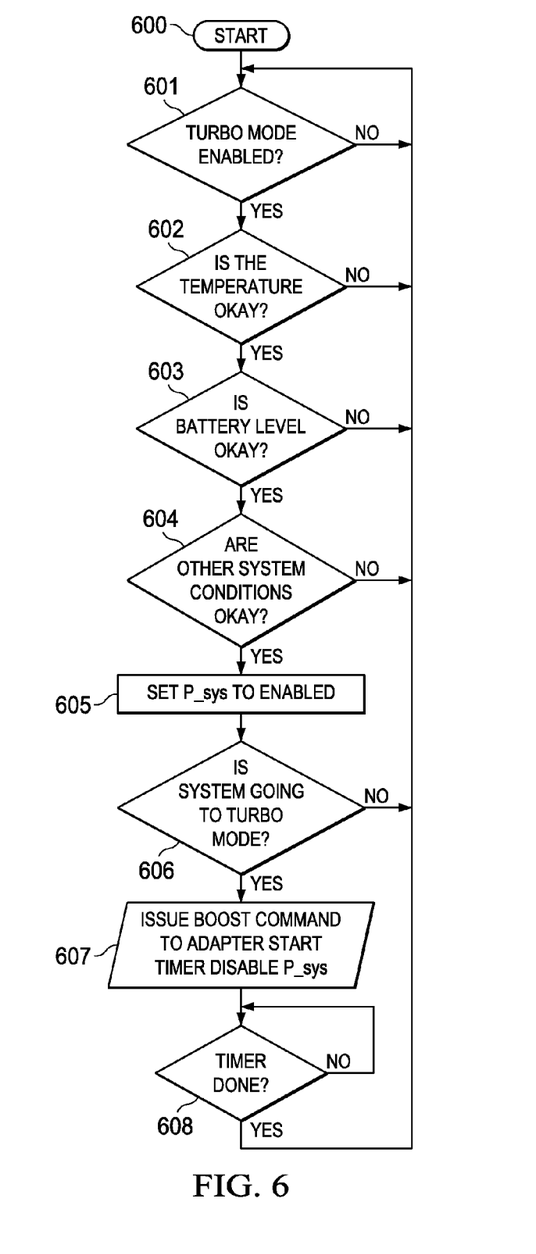
FIG. 6 is a flowchart of an example of a method for providing synchronous power bursts according to some embodiments.

FIG. 6 is a flowchart of an example of a method for synchronous power bursts. In various embodiments, the method of FIG. 6 starts at block 400 and may be performed, at least in part, by system center 408 or 508 of FIG. 4 or 5. At block 601, system center 408/508 determines whether an Operating System (OS) has enabled turbo mode. At block 602, system center 408/508 determines whether the temperature of IHS 104 (e.g., a processor temperature, a skin temperature, etc.) is within predetermined bounds. At block 603, system center 408/508 determines whether the battery level is sufficient to allow turbo, and at block 604 system center 408/508 determines whether any other configuration condition is compatible with turbo mode. If all of these pre-selected conditions are met, then at block 605 system center 408/508 sets a system flag ("P_sys") to enabled.

At this point, given that the flag is enabled, system center 408/508 determines that IHS 104 is expected to enter turbo mode at the next turbo window or opportunity. So, at block 607, system center 408/508 issues a boot command to power transmitter 402 or AC/DC adapter 501 to pre-charge capacitors 406/506 in anticipation of the turbo event. In some cases, a timer may be used to synchronize the delivery or additional charge to the capacitor for the duration of the turbo event.

At block 608, system center 408/508 determines if the timer is expired and the system is out of turbo. If so, then the additional power ceases to be delivered and control returns to block 601.

In some implementations, power transmitter 402 or AC/DC adapter 501 may include digitally controlled voltage regulators such that the voltage output (and therefore the voltage provided to capacitors 406/506) can be controlled and adjusted up. In other implementations, a reference voltage provided to a voltage regulator may be adjusted up to cause the output of the regulator to also be adjusted up.

For example, if the operating voltage across capacitors 406/506 is ordinarily 3 V, it may be adjusted to 3.3 V in anticipation of the turbo event. In that manner, the sudden increased load cause by the Turbo event is first felt by these slightly overcharged capacitors 406/506, which begin to suffer power drooping. By the time the power drooping reaches AC/DC 401, the voltage across capacitor 406 may have dropped to approximately 3 V, for example, therefore consuming the extra charge accumulated in anticipation of the turbo event. Because the voltage across capacitor 406 does not drop below a minimum threshold required for turbo, however, turbo is allowed to take place.

In some cases, block 606 may involve a characterization of a time interval (of the order or nano- or micro seconds) expected between the time P_sys is set to enabled and the time at which IHS 104 actually enters turbo mode. The time interval may be different for each different set of conditions 409. Therefore, a time-to-turbo profile may be created and stored (e.g., in a table) such that system center 408/508 can identify, from a given point in time and for any given set of conditions, how much time is expected to pass before IHS 104 enters turbo.

In addition, block 606 may involve a characterization of a delay between the time the boost command is issued and the time capacitor 406/506 is charged with the additional energy required to support turbo. Again, the delay may be different for each set of conditions 409. Accordingly, a delay profile may be created and stored (e.g., in another table) such that system center 408/508 may identify, for any given set of conditions, how much delay or overhead is expected between the time the boost command is issued and the time capacitor 506 is ready for turbo (e.g., loaded to 3.3 V).

Once the time interval and the time delay are both characterized, block 607 may send the boost request in a number of ways. First, the boost command may be transmitted a time equal to the time interval minus the time delay for immediate execution. Alternatively, in cases where downstream components (e.g., AC/DC adaptor 501 or transmitter 402) have been configured to support synchronous boost, the boost command may be transmitted sooner, or at any time, requesting that the boost state be entered at a particular time in the future (calculated to be equal to the time interval), leaving responsibility for accounting for the delay or overhead up to the charging system. Alternatively, block 607 may transmit the boost command at a time equal to the time interval minus the time delay, but each (or both) of which may correspond to a set of conditions under which a processor is expected to be when it enters the turbo mode (in the future), as opposed to the present set of conditions.

In some implementations, the systems and method described herein may be include self-learning embodiments. For example, the time interval and time delay characterizations may be unique to each IHS and may be performed dynamically, or may be periodically updated. Moreover, capacitors 406/506 may be initially overcharged by an initial amount (10%, for example), and that amount may be adjusted up or down depending upon the amount of drooping detected. In embodiments where the duration of the turbo mode is variable, the timer of block 607 may be adjustable based on historical or expected durations. Also, in embodiments where the intensity of the turbo mode is variable (e.g., when the increase in clock rate of a processor varies based upon conditions 409), the amount of capacitor pre-charge may also be adjusted dynamically based upon based on historical or expected additional charge necessary to avoid drooping below a minimum voltage threshold (e.g., 3 V).

FIG. 7 shows an example of IHS 700 configured to implement IHS 104 described herein according to some embodiments. It should be appreciated that although certain embodiments described herein may be discussed in the context of a desktop or server computer, other embodiments may be utilized with virtually any type of IHS. Particularly, IHS 700 includes a baseboard or motherboard, which is a printed circuit board (PCB) to which components or devices are coupled by way of a bus or other electrical communication path. For example, central processing unit ("CPU") 702 operates in conjunction with a chipset 704; CPU 702 is a standard central processor that performs arithmetic and logical operations necessary for the operation of IHS 700.

Chipset 704 includes northbridge 706 and southbridge 708. Northbridge 706 provides an interface between CPU 702 and the remainder of IHS 700. Northbridge 706 also provides an interface to a random access memory (RAM) used as main memory 714 in IHS 700 and, possibly, to on-board graphics adapter 712. Northbridge 706 may also be configured to provide networking operations through Ethernet adapter 710. Ethernet adapter 710 is capable of connecting IHS 700 to another IHS (e.g., a remotely located IHS) via a network. Connections which may be made by network adapter 710 may include local area network (LAN) or wide area network (WAN) connections. Northbridge 706 is also coupled to southbridge 708.

Southbridge 708 is responsible for controlling many of the input/output (I/O) operations of IHS 700. In particular, southbridge 708 may provide one or more universal serial bus (USB) ports 716, sound adapter 724, Ethernet controller 734, and one or more general purpose input/output (GPIO) pins 718. Southbridge 708 may also provide a bus for interfacing peripheral card devices such as BIOS boot system-compliant SCSI host bus adapter 730 having option ROM 731. In some embodiments, the bus may include a peripheral component interconnect (PCI) bus. Southbridge 708 may also provide baseboard management controller (BMC) 732 for use in managing the various components of IHS 700. Power management circuitry 726 and clock generation circuitry 728 may also be utilized during the operation of southbridge 708.

Southbridge 708 is further configured to provide one or more interfaces for connecting mass storage devices to IHS 700. For instance, in an embodiment, southbridge 708 may include a serial advanced technology attachment (SATA) adapter for providing one or more serial ATA ports 720 and/or an ATA100 adapter for providing one or more ATA 100 ports 722. Serial ATA ports 720 and ATA100 ports 722 may be, in turn, connected to one or more mass storage devices storing an operating system (OS) and application programs. An OS comprises a set of programs that control operations of IHS 700 and allocation of resources. An application program is software that runs on top of the OS and uses computer resources made available through the OS to perform application specific tasks desired by the user.

Mass storage devices connected to southbridge 708 and SCSI host bus adapter 730, and their associated computer-readable media provide non-volatile storage for IHS 700. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS 700. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count ("LPC") interface may also be provided by southbridge 708 for connecting Super I/O device 738. Super I/O device 738 is responsible for providing a number of I/O ports, including a keyboard port, a mouse port, a serial interface, a parallel port, and other types of input/output ports. The LPC interface may also connect a computer storage media such as a ROM or a flash memory such as a non-volatile random access memory (NVRAM) for storing firmware 736 that includes program code containing the basic routines that help to start up IHS 700 and to transfer information between elements within IHS 700. EFI firmware 736 comprises a firmware that is compatible with the EFI Specification and the Framework.

The LPC interface may also be utilized to connect NVRAM 737 to IHS 700. NVRAM 737 may be utilized by firmware 736 to store configuration data for IHS 700. In other embodiments, configuration data for IHS 700 may be stored on the same NVRAM 737 as the firmware 736.

BMC 732 may include non-volatile memory having program instructions stored thereon that are usable by CPU(s) 702 to enable remote management of IHS 700. For example, BMC 732 may enable a user to discover, configure, and manage BMC 732, setup configuration options, resolve and administer hardware or software problems, etc. Additionally or alternatively, BMC 732 may include one or more firmware volumes, each volume having one or more firmware files used by the BIOS' firmware interface to initialize and test components of IHS 700.

As a non-limiting example of BMC 732, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within IHS 700 from the factory.

It should be appreciated that, in other embodiments, IHS 700 may comprise other types of computing devices, including hand-held computers, embedded computer systems, personal digital assistants, and other types of computing devices. It is also contemplated that the IHS 700 may not include all of the components shown in FIG. 7, may include other components that are not explicitly shown in FIG. 7, or may utilize an architecture different than that shown in FIG. 7.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
determine that the processor is expected to enter a turbo mode; and
transmit a command to a power adaptor in anticipation of the turbo mode to make an additional amount of energy available to the IHS when the processor enters the turbo mode, wherein the power adaptor is configured to, in response to receiving the command and prior to the processor entering the turbo mode, preload a capacitor with an additional electrical charge sufficient to prevent power drooping below a threshold at the moment the processor enters the turbo mode.

2. The IHS of claim 1, wherein the power adaptor includes an AC power adaptor.

3. The IHS of claim 1, wherein the power adaptor includes a wireless charger.

4. The IHS of claim 1, wherein to determine that the processor is expected to enter a turbo mode, the program instructions, upon execution, further cause the IHS to monitor an Operating System (OS) for a turbo request.

5. The IHS of claim 1, wherein to determine that the processor is expected to enter a turbo mode, the program instructions, upon execution, further cause the IHS to monitor a temperature of the IHS and a battery level of the IHS.

6. The IHS of claim 1, wherein the program instructions, upon execution, further cause the IHS to characterize a time interval between the time of the determination and the time at which the processor enters the turbo mode.

7. The IHS of claim 6, wherein the program instructions, upon execution, further cause the IHS to characterize a time interval for a plurality of load conditions based, at least in part, upon a battery charge status.

8. The IHS of claim 6, wherein the program instructions, upon execution, further cause the IHS to characterize a time delay between the time the command is sent and the time at which the additional amount of energy is available to the IHS.

9. The IHS of claim 8, wherein the program instructions, upon execution, further cause the IHS to transmit the command at a time equal to the time interval minus the time delay.

10. The IHS of claim 8, wherein the command requests that the power adaptor make an additional amount of energy available to the IHS at a time equal to the time interval minus the time delay.

11. A power adaptor, comprising:
a power source; and
a controller coupled to the power source, the controller configured to, in response to receiving a command from an Information Handling System (IHS) in anticipation of the IHS entering a turbo mode:
   make an additional amount of energy available to the IHS when the IHS enters the turbo mode; and
   at least one of:
      (a) characterize a time interval between the time of the determination and the time at which the processor enters the turbo mode for a plurality of load conditions based, at least in part, upon a battery charge status;
      (b) characterize a time interval between the time of the determination and the time at which the processor enters the turbo mode, characterize a time delay between the time the command is sent and the time at which the additional amount of energy is available to the IHS and transmit the command at a time equal to the time interval minus the time delay; or
      (b) characterize a time interval between the time of the determination and the time at which the processor enters the turbo mode, and characterize a time delay between the time the command is sent and the time at which the additional amount of energy is available to the IHS, wherein the command requests that the power adaptor make an additional amount of energy available to the IHS at a time equal to the time interval minus the time delay.

12. The power adaptor of claim 11, wherein the controller is configured to preload a capacitor with an additional charge sufficient to avoid power drooping at the moment when the IHS enters the turbo mode.

13. The power adaptor of claim 11, further comprising a wireless charging pad coupled to the power source.

14. The power adaptor of claim 11, wherein the command is received via an out-of-band channel.

15. A method comprising:
characterizing a time interval between: (a) a time of a determination that a processor of an Information Handling System (IHS) is expected to enter a turbo mode and (b) a time at which the processor enters the turbo mode;
characterizing a time delay between: (a) a time a command is sent to a power adaptor requesting a power boost and (b) a time at which the power boost is available to the IHS;
storing the time interval and time delay for a given set of conditions;
determining that the processor is expected to enter the turbo mode; and
transmitting the command to a power adaptor in anticipation of the turbo mode to make the power boost available to the IHS when the processor enters the turbo mode.

16. The method of claim 15, wherein the given set of conditions includes a battery charge status and a temperature.

17. The method of claim 15, further comprising transmitting the command at a time equal to the time interval minus the time delay corresponding to a set of conditions under which the processor is at the time of the determination.

18. The IHS of claim 17, further comprising transmitting the command at a time equal to the time interval minus the time delay corresponding to a set of conditions under which the processor is expected to be when it enters the turbo mode.

* * * * *